(12) United States Patent
Williams

(10) Patent No.: US 10,224,069 B1
(45) Date of Patent: Mar. 5, 2019

(54) PHONOGRAPH RECORD TURNTABLE STABILIZING ASSEMBLIES AND METHODS

(71) Applicant: Nat Williams, Spokane, WA (US)

(72) Inventor: Nat Williams, Spokane, WA (US)

(*) Notice: Subject to any disclaimer, the term of this patent is extended or adjusted under 35 U.S.C. 154(b) by 0 days.

(21) Appl. No.: 15/676,183

(22) Filed: Aug. 14, 2017

Related U.S. Application Data

(60) Provisional application No. 62/514,461, filed on Jun. 2, 2017.

(51) Int. Cl.
*G11B 17/34* (2006.01)
*G11B 17/028* (2006.01)

(52) U.S. Cl.
CPC .......... *G11B 17/0282* (2013.01); *G11B 17/34* (2013.01)

(58) Field of Classification Search
None
See application file for complete search history.

(56) References Cited

U.S. PATENT DOCUMENTS

| | | | |
|---|---|---|---|
| 2,293,219 A | 8/1942 | Rieber | |
| 2,518,232 A | 8/1950 | Giovannucci et al. | |
| 4,071,252 A * | 1/1978 | Gillespie | G11B 19/20 192/58.3 |
| 4,072,874 A * | 2/1978 | Arnold, Jr. | G11B 19/20 310/268 |
| 4,194,743 A * | 3/1980 | Ohsawa | G11B 19/022 310/268 |
| 4,260,161 A | 4/1981 | Frank | |
| 4,332,025 A | 5/1982 | Thurston | |
| 4,541,086 A * | 9/1985 | Tanaka | G11B 17/0284 720/711 |
| 4,726,007 A | 2/1988 | McCormack | |
| 6,219,328 B1 * | 4/2001 | Kume | G11B 17/0282 369/269 |
| 6,243,351 B1 * | 6/2001 | Huang | F16F 15/363 720/702 |

(Continued)

FOREIGN PATENT DOCUMENTS

| | | |
|---|---|---|
| AT | 121374 | 2/1931 |
| GB | 2056747 | 1/1983 |

(Continued)

*Primary Examiner* — William J Klimowicz
(74) *Attorney, Agent, or Firm* — Wells St. John P.S.

(57) ABSTRACT

Phonograph record turntable stabilizing assemblies are provided that can include: a vessel having outer sidewalls; an opening within the vessel configured to receive the center spindle of the turntable; and a plurality of flowable solid particles to be received within the vessel. Phonograph record turntable stabilizing kits are provided. These kits can include: a vessel; an opening within the vessel configured to receive the center spindle of the turntable; and a plurality of flowable solid particles. Phonograph turntable assemblies are provided that can include: a phonograph turntable having a record thereon; a vessel upon the record; an opening within the vessel configured to receive the center spindle of the turntable; and a plurality of flowable solid particles within the vessel. Methods for stabilizing a record upon a turntable are provided. The methods can include: placing a vessel upon a record on a turntable; and at least partially filling the vessel with flowable solid particles.

4 Claims, 7 Drawing Sheets

(56) References Cited

U.S. PATENT DOCUMENTS

| | | | | |
|---|---|---|---|---|
| 6,418,815 B1 * | 7/2002 | Choi | ................... | F16C 33/3713 |
| | | | | 74/570.2 |
| 6,535,475 B1 * | 3/2003 | Sohn | .................... | F16F 15/363 |
| | | | | 369/264 |
| 6,711,117 B1 * | 3/2004 | Kanbe | .................... | F16F 15/18 |
| | | | | 720/701 |
| 7,058,961 B2 * | 6/2006 | Han | ..................... | F16F 15/363 |
| | | | | 720/702 |
| 7,492,549 B2 | 2/2009 | Shishido et al. | | |
| 7,942,801 B2 * | 5/2011 | Ryu | ........................ | B04B 9/14 |
| | | | | 494/82 |
| 8,468,555 B2 * | 6/2013 | Kim | ................... | G11B 19/2009 |
| | | | | 720/702 |
| 2001/0000312 A1 | 4/2001 | Kume et al. | | |
| 2001/0008515 A1 * | 7/2001 | Takeuchi | .............. | F16F 15/363 |
| | | | | 369/264 |
| 2002/0176351 A1 * | 11/2002 | Masaki | ................ | F16F 15/363 |
| | | | | 720/702 |
| 2004/0093612 A1 * | 5/2004 | Chang | ................. | F16F 15/363 |
| | | | | 720/702 |
| 2005/0071862 A1 | 3/2005 | Asabata | | |
| 2008/0253246 A1 * | 10/2008 | Huang | ............... | G11B 19/2027 |
| | | | | 369/47.36 |

FOREIGN PATENT DOCUMENTS

| | | | | |
|---|---|---|---|---|
| JP | 11127563 | A | * | 5/1999 |
| JP | 2000195123 | A | * | 7/2000 |
| JP | 2001057016 | A | * | 2/2001 |
| JP | 2010097667 | A | * | 4/2010 |

* cited by examiner

PHONOGRAPH RECORD TURNTABLE STABILIZING ASSEMBLIES AND METHODS

CROSS REFERENCE TO RELATED APPLICATION

This application claims priority to U.S. Provisional Patent Application Ser. No. 62/514,461 filed Jun. 2, 2017, entitled "Phonograph Record Turntable Stabilizing Assemblies and Methods", the entirety of which is incorporated by reference herein.

TECHNICAL FIELD

The present disclosure relates to turntable stabilizing assemblies and methods. In particular embodiments, assemblies and methods of the present disclosure can be utilized to stabilize phonograph turntables, for example.

BACKGROUND

Many believe that the best audio sound for home use is generated using phonographs, for this is pure analog sound, without any conversion to digital, for example. To get the clearest sound, it is important to maintain the proper and consistent needle contact with the record being played. Therefore, many have designed various assemblies and techniques for stabilizing turntables, that will in turn provide a stable record. Some of these turntables are quite costly, taking themselves out of the reach of the typical audiophile. The present disclosure provides phonograph record turntable stabilizing assemblies and methods.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Phonograph record turntable stabilizing assemblies are provided that can include: a vessel having outer sidewalls; an opening within the vessel configured to receive the center spindle of the turntable; and a plurality of flowable solid particles to be received within the vessel.

Phonograph record turntable stabilizing kits are provided. These kits can include: a vessel; an opening within the vessel configured to receive the center spindle of the turntable; and a plurality of flowable solid particles.

Phonograph turntable assemblies are provided that can include: a phonograph turntable having a record thereon; a vessel upon the record; an opening within the vessel configured to receive the center spindle of the turntable; and a plurality of flowable solid particles within the vessel.

Methods for stabilizing a record upon a turntable are provided. The methods can include: placing a vessel upon a record on a turntable; and at least partially filling the vessel with flowable solid particles.

Figure 1:
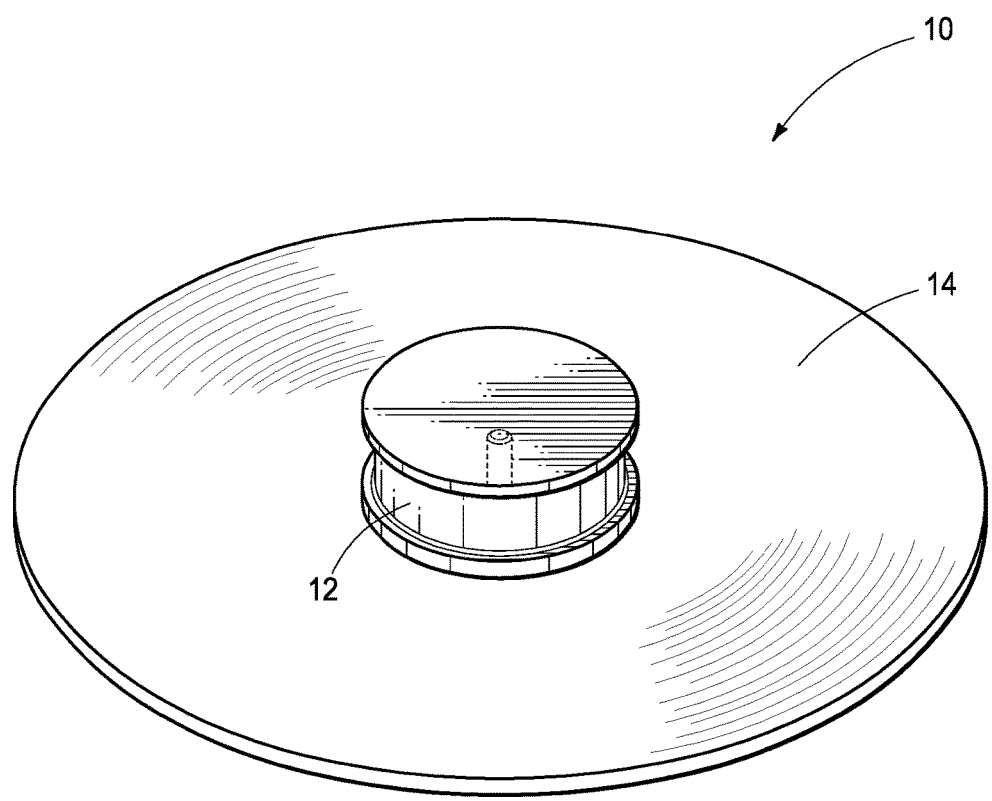
FIG. 1 is a view of a phonograph record turntable stabilizing assembly upon a record according to an embodiment of the disclosure.

The present disclosure will be described with reference to FIGS. 1-7. Referring first to FIG. 1, a record and/or turntable 14 in combination with a stabilizing assembly 12 is depicted. As depicted, assembly 12 rests at the center of record 14, and above or upon a spindle not shown but received within a portion of the assembly (depicted with dashed lines in this view). As can be seen, assembly 12 extends concentrically from a center of record 14.

Figure 2:
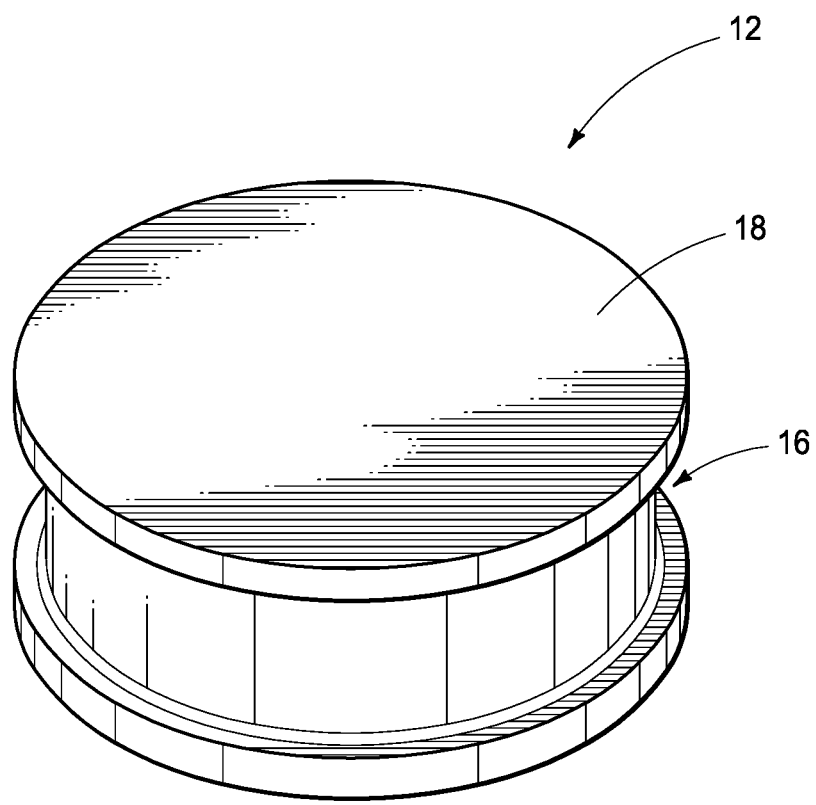
FIG. 2 is a view of a phonograph record turntable stabilizing assembly according to an embodiment of the disclosure.

Referring next to FIG. 2, assembly 12 is shown in an isometric view to include a vessel portion 16 and a lid portion 18. These components can be constructed of a desirably robust material that will remain stable in its defined configuration. However, the materials of the components can also be selected to provide very little weight in the vessel and lid, leaving the remainder of the weight to be provided by the contents of the vessel thereby providing a desirable amount of range between empty and filled vessel when practicing the stabilizing methods of the present disclosure.

Figure 3:
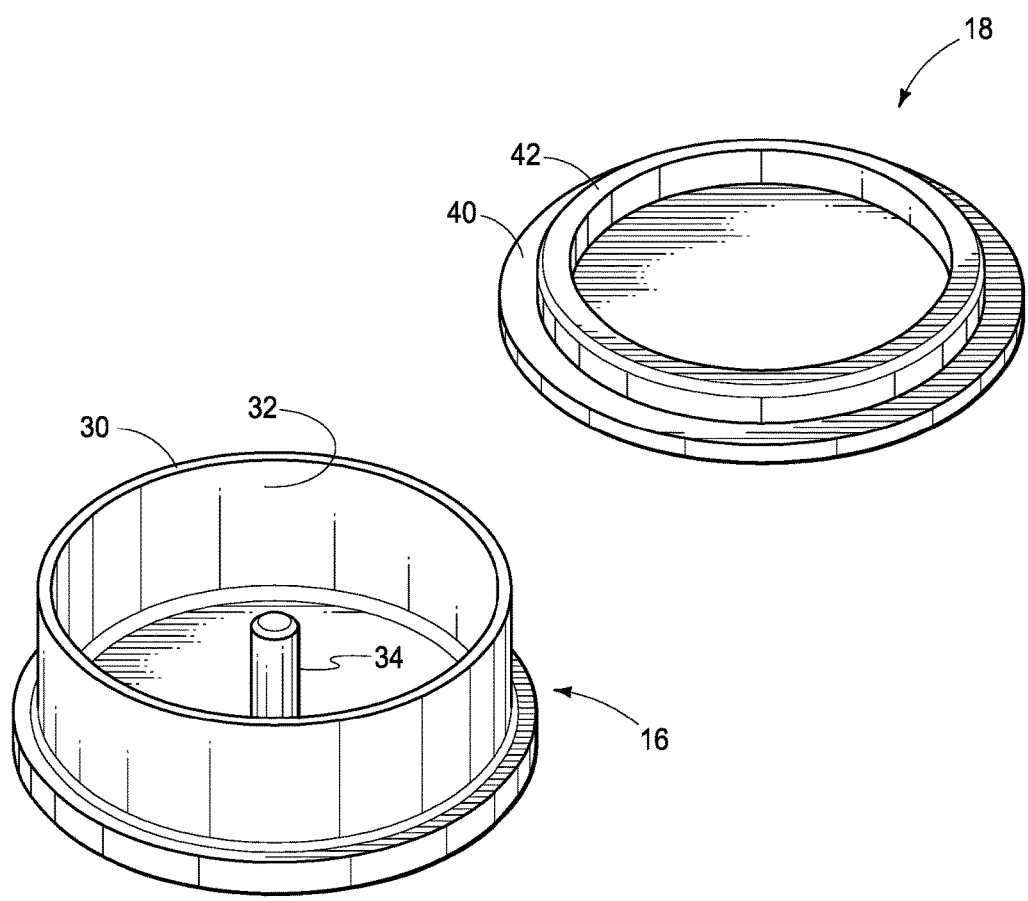
FIG. 3 is another view of the assembly of FIG. 2 according to an embodiment of the disclosure.

Referring to FIG. 3, lid 18 can include a top 40 and lip 42, and vessel 16 can include a wall 30 that defines an outer sidewall 32. Assembly 12 further includes an inner sidewall 34 that defines a receptacle for a spindle of a record player. The space between outer sidewall 32 and inner sidewall 34 can be continuous according to example implementations without barrier in between portions of same. Lip 42 can include a material to provide a snug but releasable fit to sidewall 32, such as a substantially flexible material.

Figure 4:
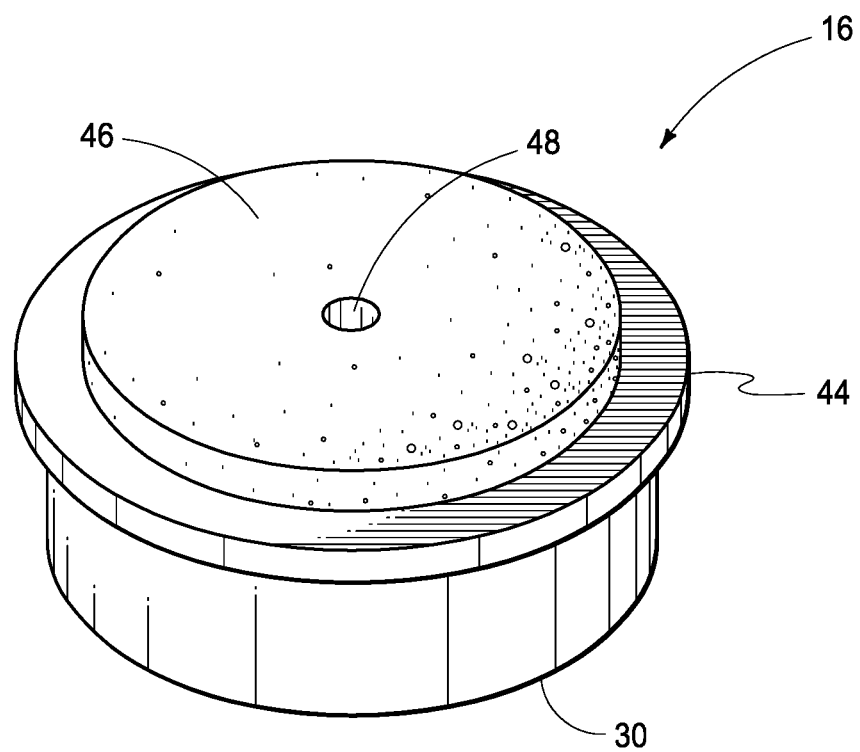
FIG. 4 is another view of the assembly of FIG. 2 according to an embodiment of the disclosure.

Referring to FIG. 4, vessel 16 can include a base 44 as well as a pad 46 about base 44 and opening 48 which can be defined by inner walls 34, for example. As depicted, base 44 can define a larger circumference than that of walls 30. Pad 46 can be an elastomeric material that may be substantially tacky, but allows for removal from record components. Pad 46 is shown with a smaller circumference than base 44 or that defined by walls 30. Accordingly, pad 46 defines an opening 48 configured to receive a spindle of a record player.

Figure 5A:
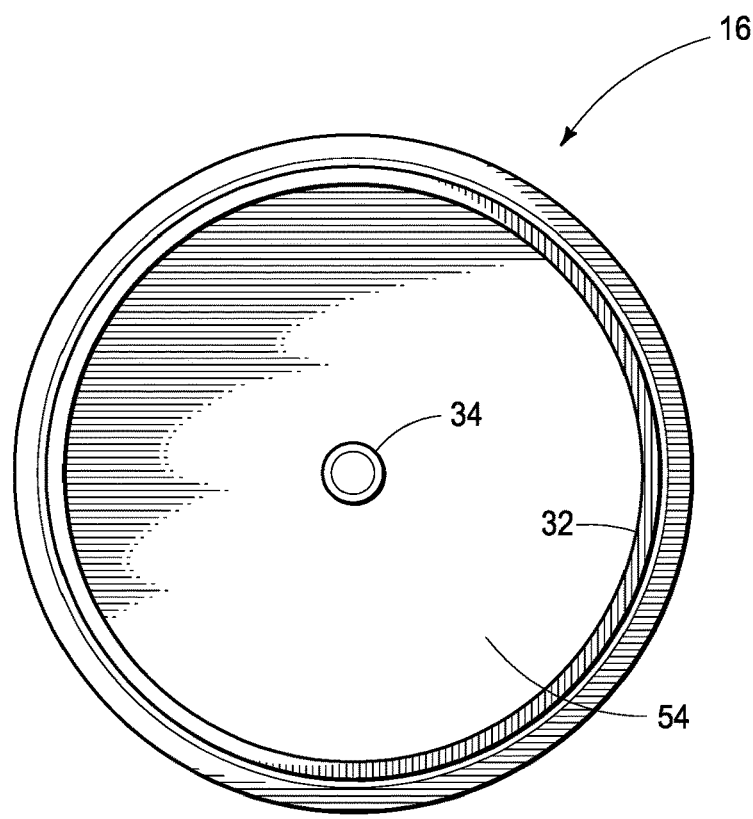
FIGS. 5A and 5B are a top view and a partial cutaway view of the stabilizing assembly of FIG. 2 according to embodiments of the disclosure.
Figure 5B:
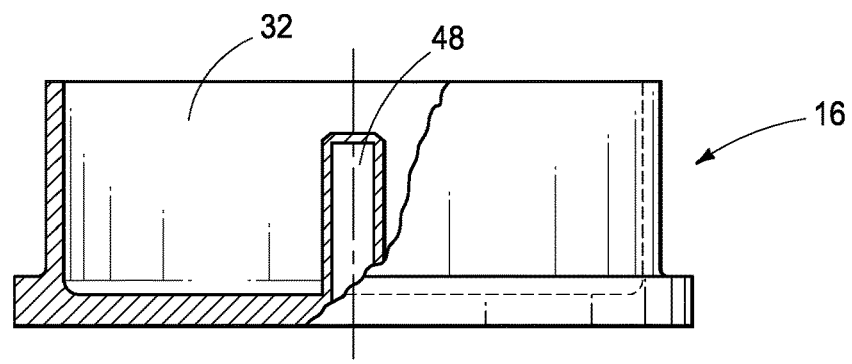

Referring next to FIGS. 5A and 5B, vessel 16 can include a bottom 54 which completes the vessel between outer sidewalls 32 and inner sidewalls 34. Further, vessel 16 can include an opening 48 configured to receive the spindle of the record player. Accordingly, the entire height of assembly 12 can be at least the length of a record player spindle extending from the record player according to example implementations. However, alternative designs can include those that provide openings for the spindle to extend completely through the assembly.

Figure 6:
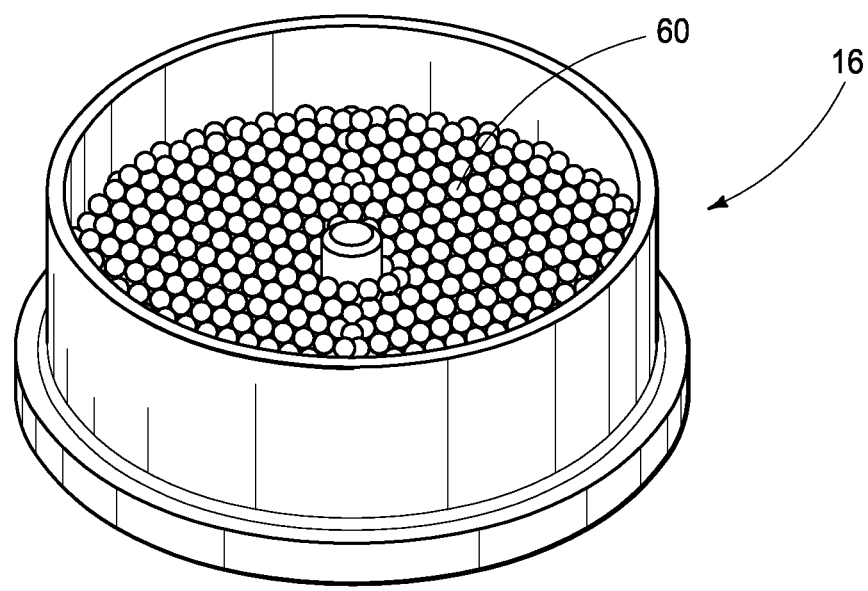
FIG. 6 is a view of the phonograph record turntable stabilizing assembly according to an embodiment of the disclosure.

Referring next to FIG. 6, vessel 16 as part of assembly 12 can include a plurality of flowable solid particles that are received within the vessel. These flowable solid particles can be shot, for example, BB's, marbles, all form or manner of individual particles that can move relative to one another within vessel 16 in and about sidewalls 32 and 34 may be utilized.

In accordance with example implementations, a record player can be provided or identified. The record player will include a turntable, a record upon the turntable and about a spindle. An open or lidless assembly 12 can be provided upon the record and engaging the spindle. Either before engaged with the spindle, or after being placed on the record, an amount of the plurality of flowable solid particles can be poured or placed in the vessel of the assembly.

The amount of particles can be user defined based on the amount of stabilization desired. For example, some players may require more particles than others to achieve optimal sound quality from that particular player.

Upon placing the particles within the vessel, the lid can be affixed and the player operated. With the lid in place, the risk of the particles becoming free from the vessel is inconsequential.

Figure 7:
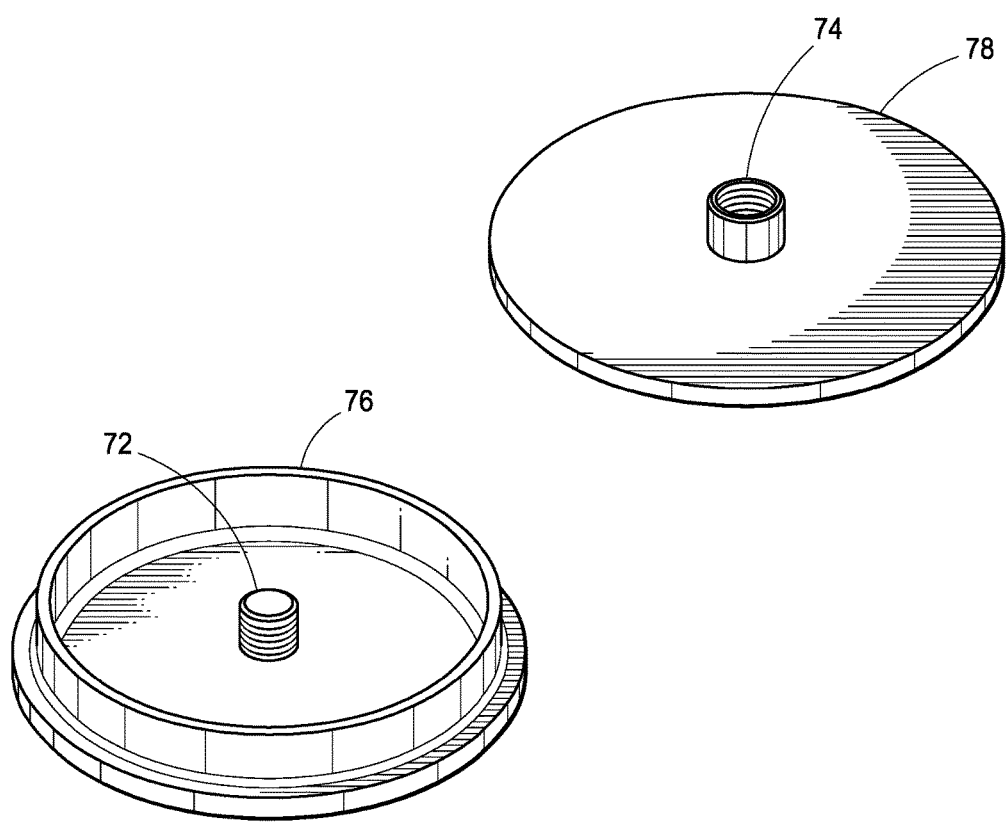
FIG. 7 is a view of a phonograph record turntable stabilizing assembly according to an embodiment of the disclosure.

Referring next to FIG. 7, another embodiment of the assembly is shown. In this embodiment, another spindle receiving portion 72 can be provided within the vessel and define inner sidewalls 34. This portion can be at least partially threaded to operatively engage a complimentary lid having a complimentary threaded extension 74. As compared to a previous embodiment of the disclosure, the embodiment of FIG. 7 can be configured to couple the lid 78 to the vessel 76 at the formation of the inner walls 34. In this example threaded couplings are provided; however, other coupling mechanisms are envisioned.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A phonograph turntable assembly comprising:
a phonograph turntable having a record thereon;
a vessel directly upon the record, the record being sandwiched between the vessel and the phonograph turntable, the vessel having outer sidewalls;
an opening within the vessel configured to receive a center spindle of the turntable; and
a plurality of flowable solid particles within the vessel that extend contiguously between the outer sidewalls and the opening.

2. The assembly of claim 1 further comprising cushioning material between the vessel and the record.

3. The assembly of claim 1 wherein the vessel defines an outer perimeter less than the perimeter of a record label.

4. The assembly of claim 1 wherein the vessel is round in at least one cross section.

\* \* \* \* \*